United States Patent [19]
Fuoco et al.

[11] Patent Number: 5,353,417
[45] Date of Patent: Oct. 4, 1994

[54] PERSONAL COMPUTER WITH BUS INTERFACE CONTROLLER COUPLED DIRECTLY WITH LOCAL PROCESSOR AND INPUT/OUTPUT DATA BUSES AND FOR ANTICIPATING MEMORY CONTROL CHANGES ON ARBITRATION FOR BUS ACCESS

[75] Inventors: Daniel P. Fuoco; Luis A. Hernandez; Eric Mathisen, all of Boca Raton; Dennis L. Moeller, Delray Beach, all of Fla.; Jonathan H. Raymond, Essex Junction, Vt.; Esmaeil Tashakori, Delray Beach, Fla.

[73] Assignee: International Business Machines Corp., Armonk, N.Y.

[21] Appl. No.: 706,534

[22] Filed: May 28, 1991

[51] Int. Cl.$^5$ .................. G06F 13/00; G06F 12/00
[52] U.S. Cl. .................. 395/325; 395/425; 364/DIG. 1; 364/240.2; 364/240.5; 364/242.92; 364/246.91; 364/263.1; 364/264.5; 364/964.9
[58] Field of Search ..................... 395/325, 425

[56] References Cited
U.S. PATENT DOCUMENTS

| | | | |
|---|---|---|---|
| 5,029,074 | 7/1991 | Maskas et al. | 364/DIG. 1 |
| 5,034,917 | 7/1991 | Bland et al. | 364/DIG. 2 |
| 5,179,667 | 1/1993 | Iyer | 395/275 |
| 5,202,857 | 4/1993 | Yanai et al. | 365/233 |
| 5,220,651 | 6/1993 | Larson | 395/250 |

Primary Examiner—Eddie P. Chan
Attorney, Agent, or Firm—Daniel E. McConnell

[57] ABSTRACT

This invention relates to personal computers, and more particularly to personal computers in which arbitration for control over a data handling bus occurs among a plurality of "master" devices coupled directly to the bus and memory address signals are varied in response to such arbitration. The personal computer system has a high speed local processor data bus, an input/output data bus, a microprocessor coupled directly to the local processor bus, volatile memory coupled to the local processor bus for volatile storage of data, and a bus interface controller coupled directly to the local processor bus and directly to the input/output data bus for providing communications between the buses. The bus interface controller provides for arbitration among devices directly coupled to the input/output data bus for access to the input/output data bus and to the local processor bus, and for arbitration among the input/output data bus and said microprocessor for access to the local processor bus. The bus interface controller is also coupled to the volatile memory for supplying row address select signals to the volatile memory and thereby selecting data storage areas to be accessed, and responds to a change in access granted to the local bus by changing the row address select signal supplied to the volatile memory in preparation for access to potentially different data storage areas of the volatile memory.

15 Claims, 6 Drawing Sheets

PERSONAL COMPUTER WITH BUS INTERFACE CONTROLLER COUPLED DIRECTLY WITH LOCAL PROCESSOR AND INPUT/OUTPUT DATA BUSES AND FOR ANTICIPATING MEMORY CONTROL CHANGES ON ARBITRATION FOR BUS ACCESS

FIELD AND BACKGROUND OF DISCLOSURE

This invention relates to personal computers, and more particularly to personal computers in which arbitration for control over a data handling bus occurs among a plurality of "master" devices coupled directly to the bus and memory address signals are varied in response to such arbitration.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. In the beginning, the Family I models typically used the popular INTEL 8088 or 8086 microprocessor as the system processor. These processors have the ability to address one megabyte of memory. Later Family I models and the Family II models typically use the higher speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As personal computer technology has developed and moved from eight to sixteen and eventually thirty two bit wide bus interaction and higher speed microprocessors capable of real and protected mode operation, performance capability has been sought by separating the architecture of the personal computer into varying bus areas. More specifically, in the original IBM PC, what came to be known as the expansion bus was essentially a direct extension of the microprocessor (8086 or 8088) connections, buffered and demultiplexed as required. Later, as the AT bus specification was developed and came into wide use (now being also known as the Industry Standard Architecture or ISA), it became possible to sever the nearly direct connection between the microprocessor and the bus, giving rise to the presence of what became known as the local processor bus and the renaming of the expansion bus as the input/output bus. Typically, in order to enhance performance, the local processor bus runs at a higher clock speed (typically expressed in Hertz) than does the input/output bus. The IBM AT architecture also opened the possibility of running more than one microprocessor on the input-/output bus, through use of direct memory access (DMA) interrupts.

As performance enhancement has continued to be sought, difficulties inherent in opening the possibility of multiple masters contending for access to and control of the local processor bus have become apparent, as have the potential benefits of consolidating the functions necessary in operating a personal computer in as few integrated circuit chips as possible.

BRIEF DESCRIPTION OF THE INVENTION

With the foregoing in mind, it is an object of this invention to facilitate enhanced performance in a personal computer in which a plurality of "master" devices coupled directly to a data handling bus arbitrate for control over the bus. In realizing this object of the present invention, memory control signals are varied in response to such arbitration.

A further object of this invention is to accelerate memory access by providing for pre-charge of memory addresses as arbitration occurs in a personal computer of the type described. In realizing this object of the present invention, wait states are minimized during changes in memory access as arbitration occurs.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, a microcomputer embodying the present invention is there shown and generally indicated at 10

Figure 1:
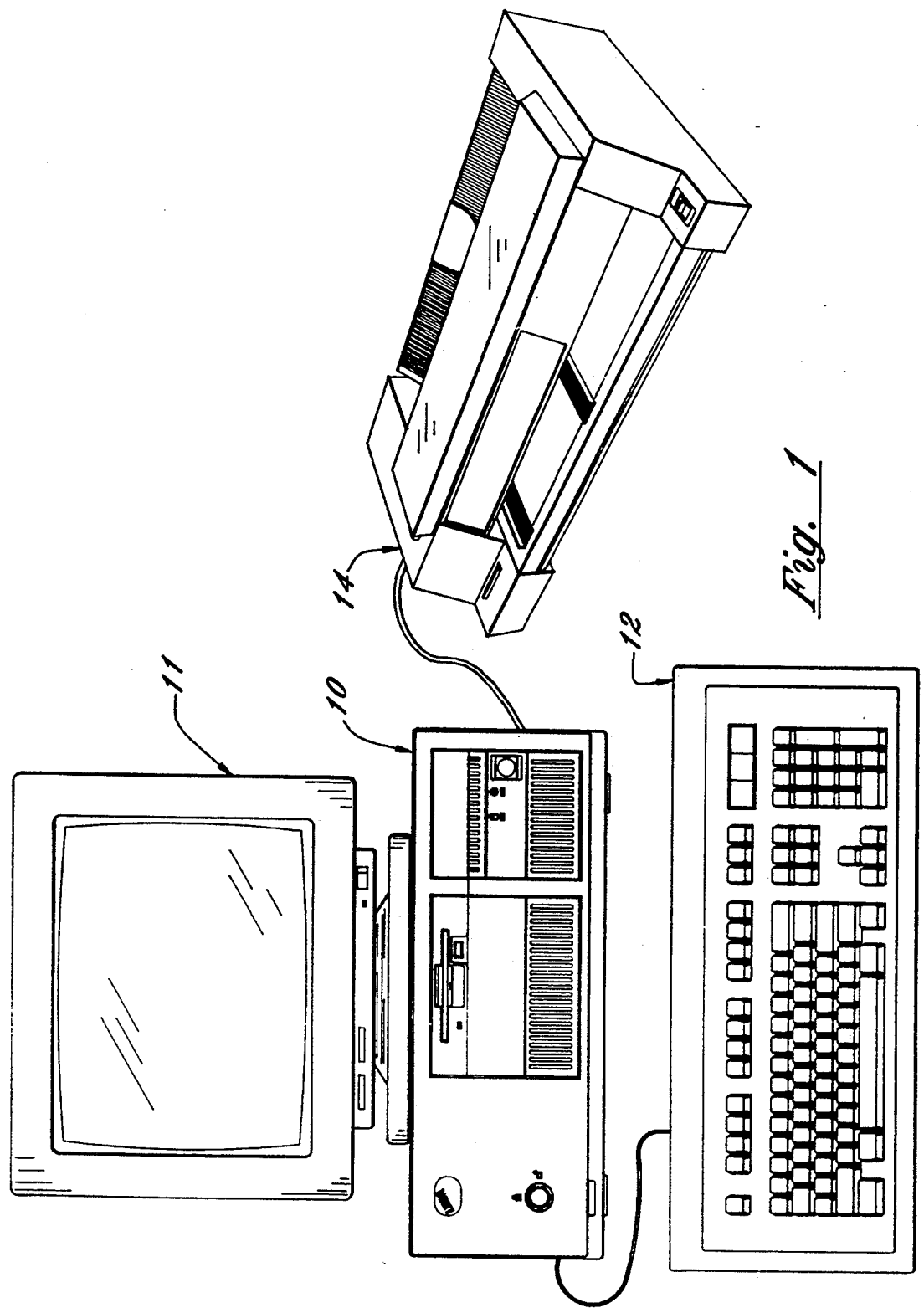
FIG. 1 is a perspective view of a personal computer embodying this invention.
Figure 2:
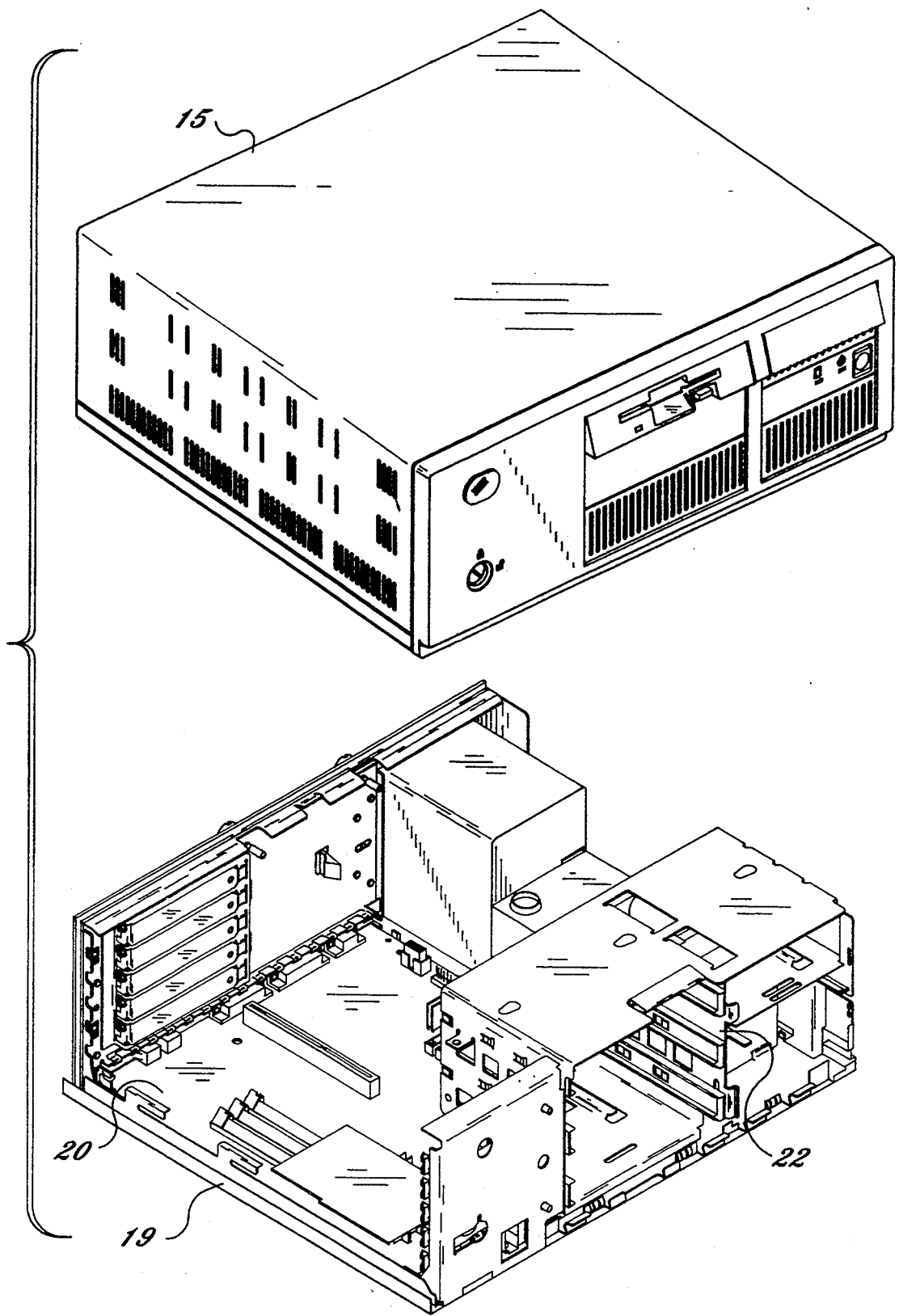
FIG. 2 is an exploded perspective view of certain elements of the personal computer of FIG. 1 including a chassis, a cover, and a planar board and illustrating certain relationships among those elements.

(FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
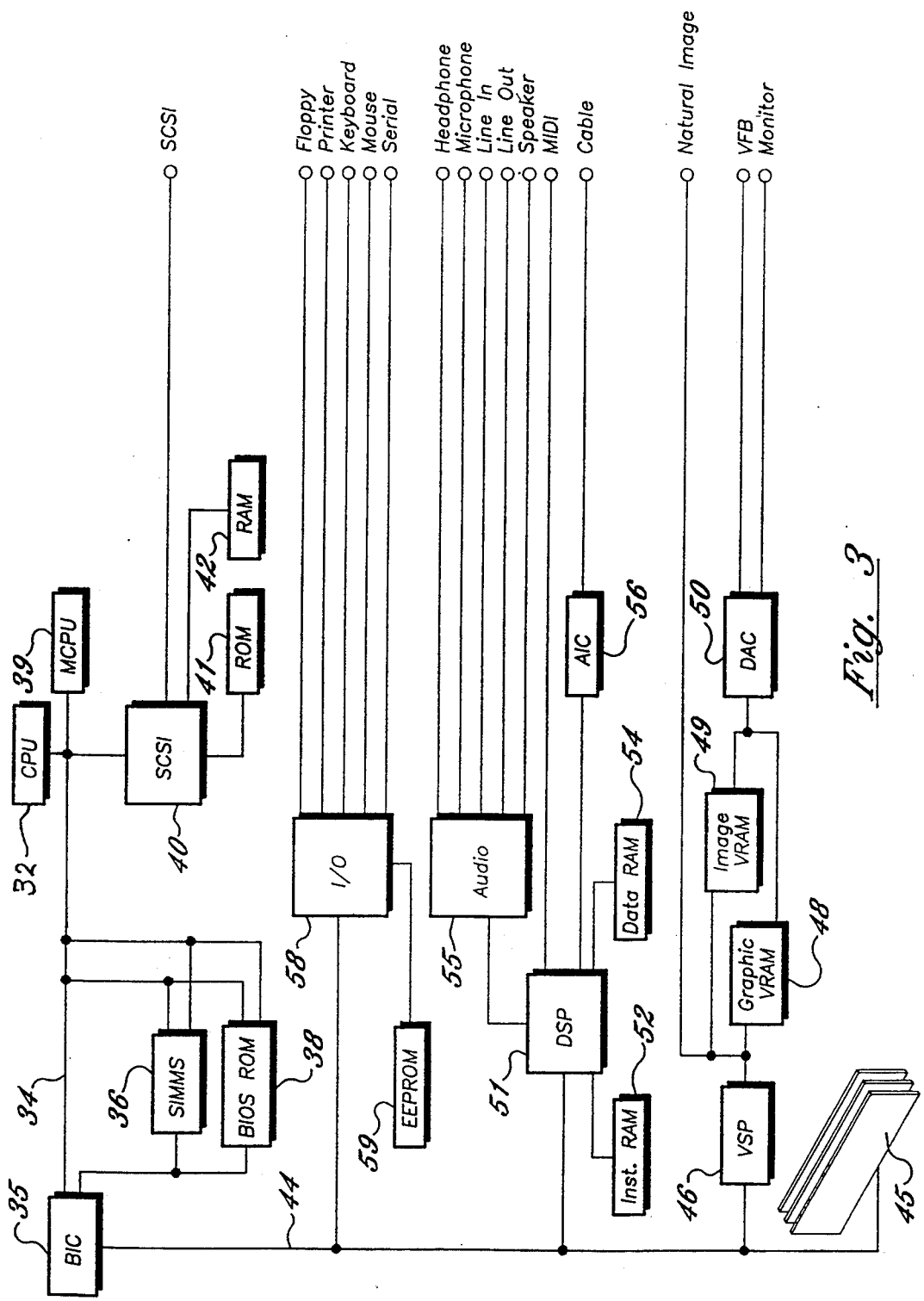
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80486 microprocessor.

Returning now to FIG. 3, the CPU local bus 34 (comprising data, address and control components) also provides for the connection of the microprocessor 32 with a numeric or math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44 and functions as a protocol translator, memory controller and DMA controller among other functions. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. The I/O bus 44 may be configured to bus specifications other than the MICRO CHANNEL specification.

Coupled along the I/O bus 44 are a variety of I/O components such as a video signal processor 46 which is associated with video RAM (VRAM) for storing character based information (indicated at 48) and for storing graphic or image based information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Before turning in greater detail to a description of the functions served by the BIC 35, it is appropriate to first consider the support by a personal computer of what have been known as multiple masters or bus masters. As here used, a "master" is a processor or any circuit designed to gain control over a bus and drive address, data and control signals on the bus. Having such capability enables a master device to transfer information between system memory and other devices.

It has been proposed that masters be divided among three types—system master (usually the CPU), DMA controller, and bus master. The system master controls and manages the system configuration. It is usually the default master in the system. The default master owns the bus when no other master requires it. A DMA master is a special type of master which transfers data between DMA slaves and memory slaves, and does not arbitrate for the bus but services the DMA slave that is the arbitrator. As here used, a bus master arbitrates for use of the bus and supports information transfers with an I/O slave or memory slave.

What makes a device a "bus master" can be confusing, as bus masters do not necessarily require a processor. Also, a bus master may be called on to respond as a slave when accessed by another bus master. A bus master is distinguished by the capability of gaining control of the bus through arbitration and controlling the execution of a defined bus cycle. Generally, there are three types of bus masters: full function, special function controllers, and programmable special function controllers. The fundamental differences among them are degrees of flexibility, function and cost. The full function bus master is the most flexible, has the most function, and costs most. Typically, a full function bus master will have its own programmable CPU and be capable of controlling all system resources, including operating system software. Special function controllers have the least flexibility, function and cost. Typically, a special function controller will use logic circuits but no CPU to perform a specific function while requiring little or no assistance from other masters. Programmable special function controllers span the range between the other two. The fundamental difference between special function and programmable special function controllers is the ability to modify the function and/or execution characteristics of the bus master. Such modification can be accomplished through use of processing units or through settable registers.

Within the definitions here given, the CPU 32 and SCSI controller 40 may function as masters directly coupled to or on the local bus 34, while the I/O controller 58, DSP 51, VSP 46 and possibly accessory boards 45 mounted in the MICRO CHANNEL slots may all function as masters directly coupled to or on the input/output bus 44.

With such multiple masters, the BIC 35 functions to provide for arbitration among devices directly coupled to the input/output bus 44 for access to the input/output bus and to the local processor bus 34, and for arbitration among the input/output bus 44 and the master devices coupled directly to the local processor bus 34 for access to the local processor bus 34. This "layering" of arbitration procedures is illustrated and described more fully in co-pending application Ser. No. 07/706,602, filed May 28, 1991 and owned in common with the present subject invention. As there shown and described, the BIC 35 functions as a central arbitration control point (CACP) for the I/O bus 44 by the exchange of certain signals with that bus and also functions as a local bus arbitration control point (LBACP) by the exchange of certain signals with the CACP, the I/O bus 44 and the masters directly connected to local processor bus 34.

At this point, it is to be noted that the BIC 35 and each local bus 34 master (CPU 32 and SCSI controller 40 in the illustrated embodiment) are connected by signals dedicated to bus arbitration. In the instance of the CPU 32, such signals are identified as HOLD and HLDA; of the SCSI controller 40 and any other master device coupled directly to the local processor bus, BRQn# and BGTn# (the lower case letter "n" to be replaced by a digit identifying a specific master). BRQn# is an output from the master to the LBACP function of BIC 35 indicating a request for control of the local bus 34. BRQn# is an active LOW signal. The masters will drive the corresponding BRQn# active and await assertion of BGTn# before driving the local bus 34. A winning local bus master will take BRQn# inactive when BGTn# is sampled inactive or when it has finished using the bus. Taking BRQn# inactive serves as an indication that the address bus and bus cycle definition signals are being placed in a high impedance state.

BGTn# is an output from the LBACP function of the BIC 35 to the master indicating that the master has been granted control of the local bus 34. BGTn# is an active LOW signal. This signal will be held active by the LBACP until BRQn# is driven inactive or another bus request is received by the LBACP. If BGTn# is taken inactive by the LBACP, the current local bus master will release the bus (driving BRQn# inactive) as soon as the current transfer is completed. The LBACP will not drive BGTn# active for the next local bus request pending until the previous master has driven BRQn# inactive and it has completed the last transfer.

A priority and simple rotational fairness scheme are implemented in the LBACP, with local bus devices being ranked by assignment of priority numbers from highest priority (identified as device "1") to lowest priority (identified as device "n" where the letter represents the highest number provided for in the functional design). Due to the possibility of a higher priority device precluding a lower priority device from winning the bus, the pendency of bus access requests will cause the LBACP to put any winning master into an inactive state after it finishes data transfer and not grant the bus to that device until after all other requestors have received bus service.

When an input/output bus device (such as the I/O controller 58, digital signal processor 51 or video signal processor 46) controls the input/output bus 44 and requests are pending on the local bus 34, the LBACP will compete on behalf of the local bus masters in I/O bus arbitration cycles performed by the CACP function. The LBACP function may have a different arbitration level assigned for each master, recognizing the priorities assigned as described above. If any assigned arbitration level wins at the I/O bus level, then the LBACP function will drive BURST# active and allocate control of the bus among all local processor bus masters that have pending requests.

As will be recognized by the knowledgeable reader, memory controllers conventionally use row address select (RAS) and column address select (CAS) signals for selecting particular areas of system memory (such as memory 36 in FIG. 3) to access. Many memory controllers keep a RAS line active during Input/Output and ROM cycles for the purpose of improving performance. In such a system, data access to memory is quickened if the next memory cycle is in the bank and page previously activated. Such memory control logic will deactivate a RAS line when the maximum allowable time is exceeded for RAS to be active; during a refresh cycle; and when a memory cycle is not in the same bank and page. In the latter instance in particular, wait states are necessarily introduced to effect the necessary shift in memory access.

In accordance with the present invention, such wait states are reduced or eliminated by an anticipatory precharge of RAS. More particularly, and as discussed more fully hereinabove, the various masters in a multiple master personal computer system will most likely use different pages of memory. Knowing that, then the memory controller function of the BIC 35 will vary RAS signals (if active) each time that a master captures the associated bus. By doing this, the memory controller function is free to service the first cycle more quickly. Various sequences of such operations are illustrated more specifically in FIGS. 4 through 8.

Figure 4:
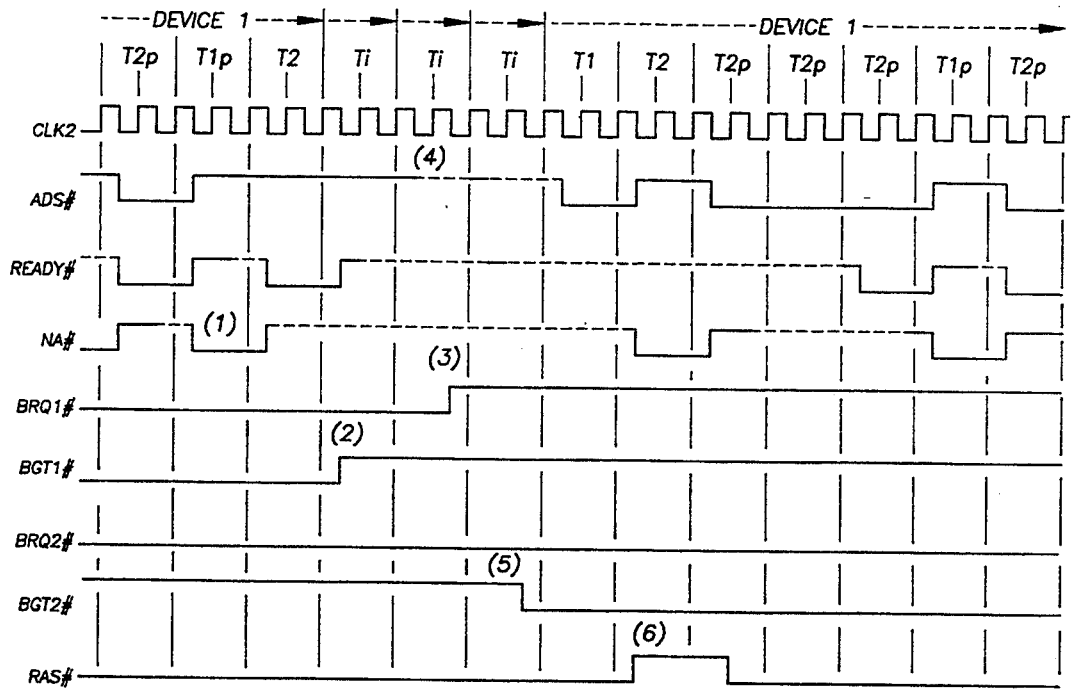
FIGS. 4 through 8 are signal charts illustrating operation of a bus interface controller included among the components of FIG. 3 in various operating circumstances.

In FIG. 4, a RAS pre-charge occurs in the absence of an indication of a new master. At a first point (1), a local bus slave requests pipelining and the current master for the local processor bus is unable to supply the next memory address. The local bus arbitration control point (LBACP) function then takes BGT1# inactive during an idle state on the bus, at a second point (2), and the first device removes BRQ1# at a third point (3) and places a number of other signals in a high impedance state at a fourth point (4). The LBACP signals a change in active master at a fifth point (5) by taking BGT2# active. Thereafter, the memory controller logic detects a bank and page miss at a sixth point (6), causing a RAS pre-charge.

Figure 5:
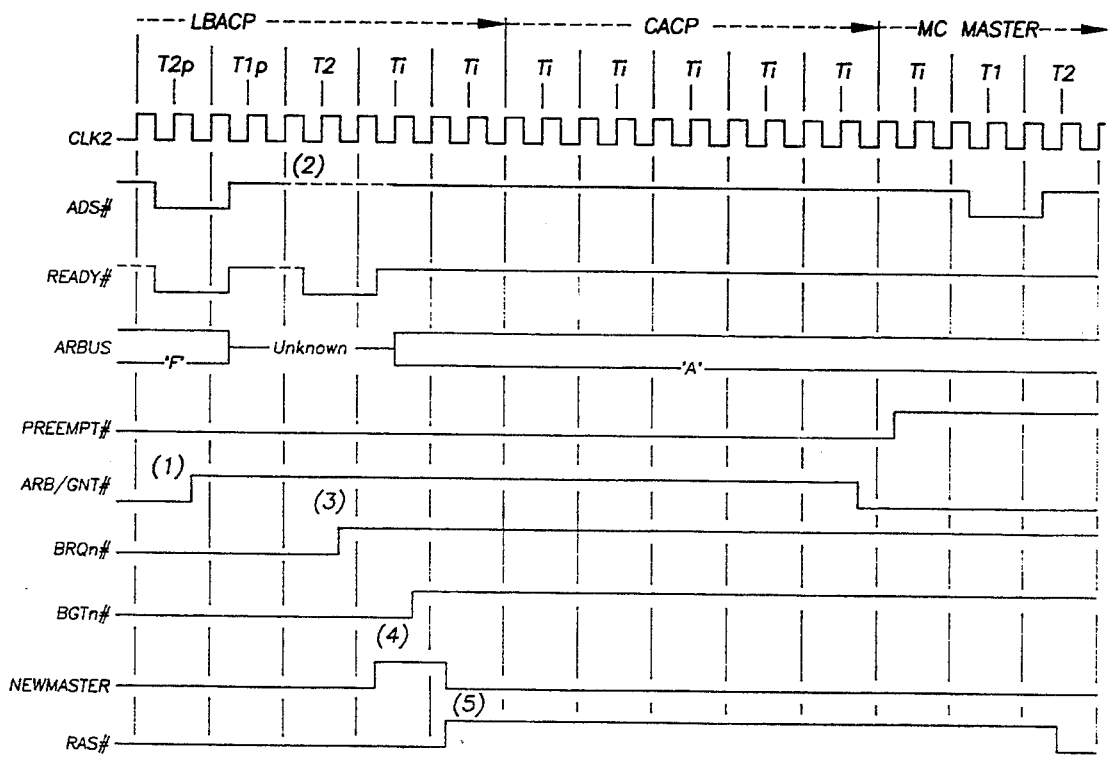

In the sequence of FIG. 5, a RAS pre-charge occurs during an input/output bus arbitration cycle. The LBACP function takes ARB/GNT# and CAC-P_HOLD active at a first point (1) in response to an input/output bus master requesting to preempt the bus. The then active device places a number of signals in a high impedance state at a second point (2), and then removes BRQn# indicating a readiness to release the bus at a third point (3). The LBACP function takes BGTn# inactive and activates a signal known as NEW-MASTER at a fourth point (4). The memory controller logic detects the change of bus masters indicated by NEWMASTER and inactivates RAS# at a fifth point (5).

Figure 6:
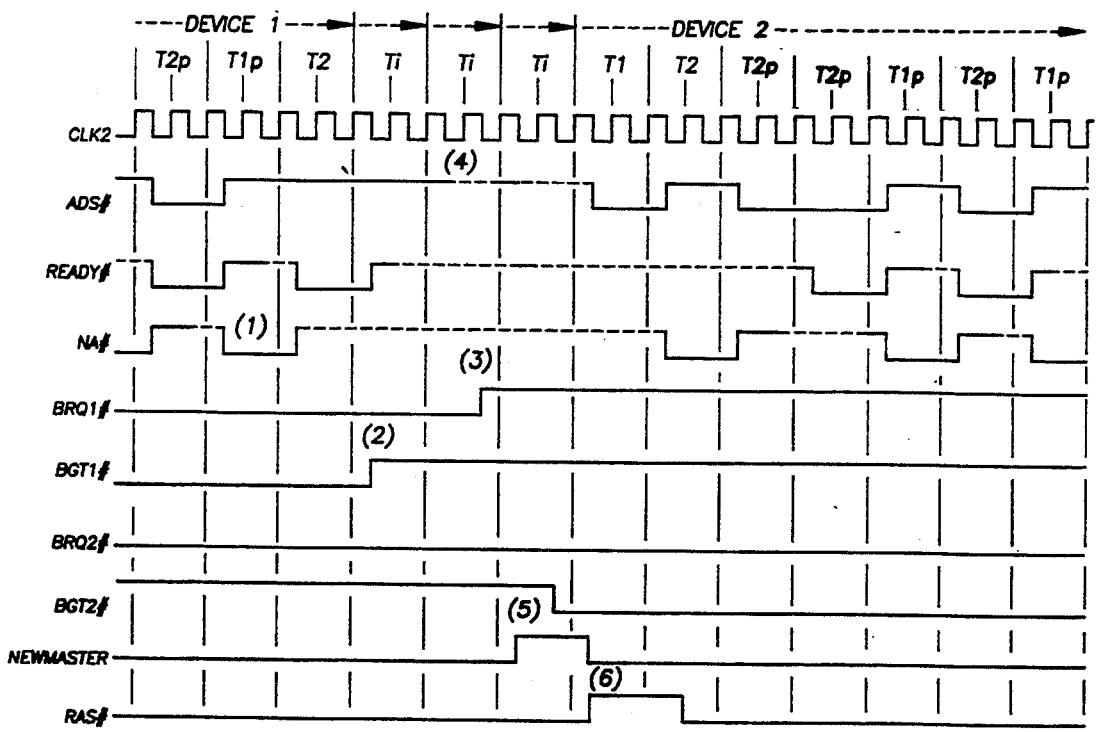

For comparison, FIG. 6 illustrates a similar sequence during arbitration on the local processor bus. There, a local bus slave requests pipelining and the current master for the local processor bus is unable to supply the next memory address at a first point (1). The LBACP function then takes BGT1# inactive during an idle state on the bus, at a second point (2), and the first device removes BRQ1# at a third point (3) and places a number of other signals in a high impedance state at a fourth point (4). The LBACP signals a change in active master at a fifth point (5) by taking BGT2# and NEWMAS-TER active. Thereafter, the memory controller logic detects the change of bus masters indicated by NEW-MASTER and inactivates RAS# at a sixth point (6).

Figure 7:
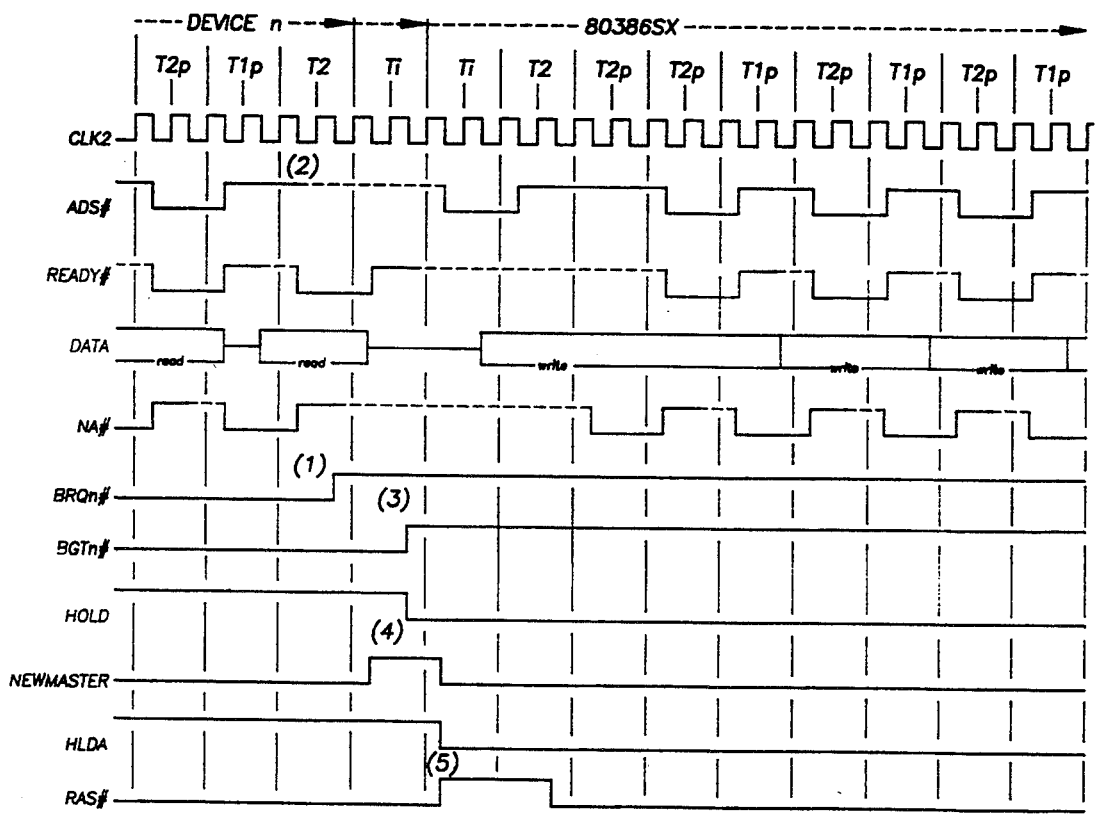

A RAS pre-charge can occur when the LBACP gives the local bus to the system default master or system processor 32 as illustrated in FIG. 7. There, a master device responds to NA# by removing BRQn# at a first point (1), indicating that it is ready to release the bus, and places a number of other signals in a high impedance state at a second point (2). The LBACP function then takes BGTn# inactive at a third point (3), and takes HOLD inactive and NEWMASTER active at a fourth point (4). Thereafter, the memory controller logic detects the change of bus masters indicated by NEWMASTER and inactivates RAS# at a fifth point (5).

Figure 8:
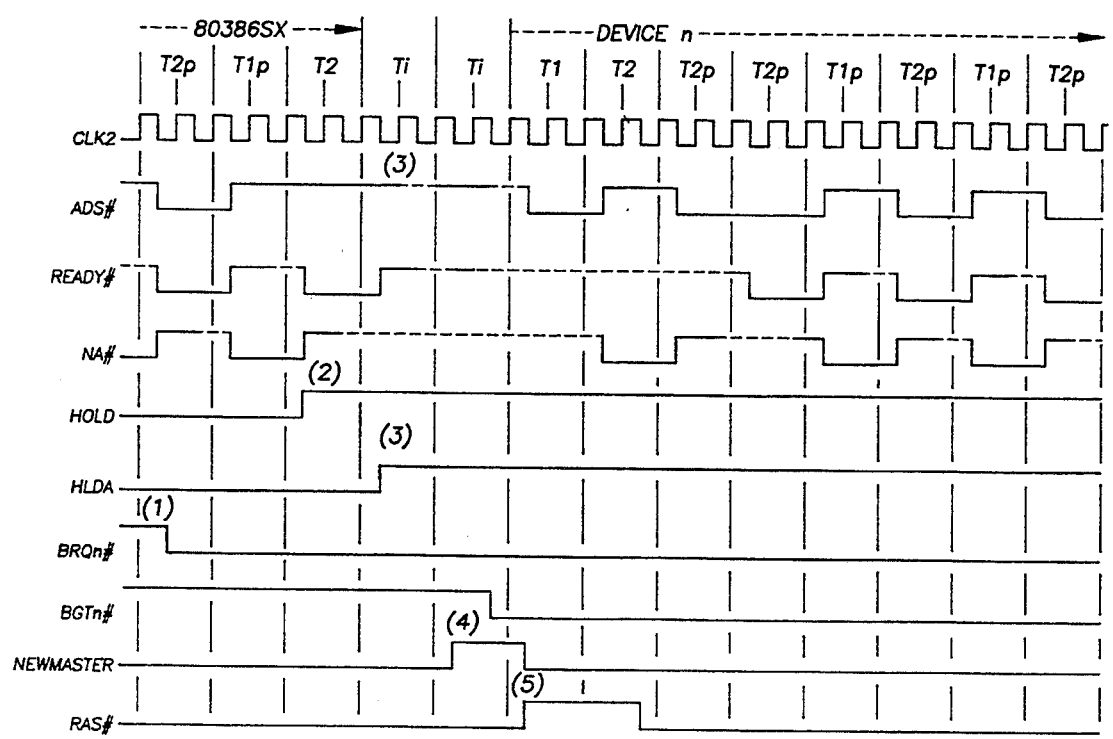

FIG. 8 illustrates a sequence when the LBACP bumps the system processor and gives the local processor bus to another device. There, a requesting device activates BRQn# at a first point (1). The LBACP function detects BRQn# active and activates HOLD at a second point (2). The system processor 32 returns HLDA and turns off output drivers at a third point (3). The LBACP detects HLDA at a fourth point (4) and activates BGTn# and NEWMASTER. The memory controller logic detects the change of bus masters indicated by NEWMASTER and inactivates RAS# (if then active) at a fifth point (5).

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
   a high speed local processor data bus;
   an input/output data bus;
   a microprocessor coupled directly to said local processor data bus and functioning as a first master device;
   a second master device coupled directly to said local processor data bus;
   volatile memory coupled to said local processor data bus for volatile storage of data; and
   a bus interface controller coupled directly to said local processor data bus and directly to said input-/output data bus for providing communications between said local processor data bus and said input/output data bus,
   said bus interface controller providing for (a) arbitration among said microprocessor and said second master device coupled directly to said local processor data bus for grant of access to said local processor data bus, and (b) arbitration among any devices coupled directly to said input/output data bus and said local processor data bus for grant of access to said input/output data bus,
   said bus interface controller being coupled to said volatile memory for supplying row address select signals to said volatile memory and thereby selecting data storage areas to be accessed,
   said bus interface controller responding to a change in grant of access to said local processor data bus to one of said microprocessor and said second master device coupled directly to said local processor data bus by providing an anticipatory precharge of memory addresses and changing the row address select signal supplied to said volatile memory in preparation for access to potentially different data storage areas of said volatile memory more likely to be used by the one of said microprocessor and said second master device coupled directly to said local processor data bus which has won an arbitration for grant of access to said local processor data bus and thus minimizing wait states during changes in memory access as arbitration occurs.

2. A personal computer according to claim 1 wherein said bus interface controller defines (1) a local bus arbitration control point through which said master devices coupled directly to said local processor data bus arbitrate for access to said local processor data bus and (2) a central arbitration control point through which any devices coupled directly to said input/output data bus arbitrate for access to said input/output data bus,
   each of said master devices signals to said bus interface controller a request for control of said local processor data bus, and
   said bus interface controller signals to each of said master devices any grant of a signalled request for control of said local processor data bus.

3. A personal computer according to claim 2 wherein said bus interface controller ranks said master devices in priority order for signalling a grant of control.

4. A personal computer according to claim 3 wherein said bus interface controller rotates priority among said master devices and assigns lowest priority among a plurality of master devices each signalling a request for bus access to that master device which has most recently obtained control of the local processor bus.

5. A personal computer according to claim 1 wherein
said bus interface controller defines (1) a local bus arbitration control point through which said master devices coupled directly to said local processor data bus arbitrate for access to said local processor data bus and (2) a central arbitration control point through which any devices coupled directly to said input/output data bus arbitrate for access to said input/output data bus,
one of said master devices is a default master normally controlling said local processor data bus,
both of said control points exchange with said input/output bus signals indicative of input/output bus arbitration, preemption and burst data transfer,
said control points exchange with one another signals indicative of a hold on arbitration by said central arbitration control point and of acknowledgement of such a hold, and
said local bus arbitration control point exchanges with said default master signals indicative of a hold on access by said default master and of acknowledgement of such a hold.

6. A personal computer system comprising:
a high speed data bus;
an input/output data bus;
a microprocessor coupled directly to said high speed data bus;
volatile memory coupled directly to said high speed data bus for volatile storage of data;
a storage memory device for nonvolatile storage of data;
a storage controller coupled directly to said high speed data bus and to said storage memory device for regulating communications with said storage memory device; and
a bus interface controller coupled to said high speed data bus and to said input/output data bus for providing communications between said high speed data bus and said input/output data bus,
said bus interface controller providing for (a) arbitration among said microprocessor and said storage controller coupled directly to said high speed data bus for access to said high speed data bus, and (b) arbitration among said high speed data bus and any devices coupled directly to said input/output data bus for access to said input/output data bus,
said bus interface controller further being coupled to said volatile memory for supplying row address select signals to said volatile memory and thereby selecting data storage areas to be accessed, and
said bus interface controller responding to a change in grant of access to said high speed data bus to one of said microprocessor and said storage controller by providing an anticipatory precharge of memory addresses and changing the row address select signal supplied to said volatile memory in preparation for access to potentially different data storage areas of said volatile memory more likely to be used by the one of said microprocessor and said storage controller which has won an arbitration for grant of access to said high speed data bus and thus minimizing wait states during changes in memory access as arbitration occurs.

7. A personal computer according to claim 6 wherein
said bus interface controller defines (1) a local bus arbitration control point through which said storage controller arbitrates for access to said high speed data bus and (2) a central arbitration control point through which any devices coupled directly to said input/output data bus arbitrate for access to said input/output data bus,
said storage controller signals to said bus interface controller any request for control of said high speed data bus, and
said bus interface controller signals to each of said microprocessor and said storage controller any grant of control of said high speed data bus.

8. A personal computer according to claim 7 wherein said bus interface controller ranks said microprocessor and said storage controller in priority order for signalling a grant of control.

9. A personal computer according to claim 8 wherein said bus interface controller rotates priority among said storage controller and any other two master devices coupled directly to said local processor bus and assigns lowest priority among any two such devices and said storage controller each signalling a request for bus access to that one which has most recently obtained control of the local processor bus.

10. A personal computer according to claim 6 wherein
said bus interface controller defines (1) a local bus arbitration control point through which said storage controller arbitrates for access to said high speed data bus and (2) a central arbitration control point through which any devices coupled directly to said input/output data bus arbitrate for access to said input/output data bus,
said microprocessor is a default master normally controlling said high speed data bus,
both of said control points exchange with said input/output bus signals indicative of input/output bus arbitration, preemption and burst data transfer,
said control points exchange with one another signals indicative of a hold on arbitration by said central arbitration control point and of acknowledgement of such a hold, and
said local bus arbitration control point exchanges with said microprocessor signals indicative of a hold on access by said microprocessor and of acknowledgement of such a hold.

11. A personal computer system comprising:
a high speed data bus;
a microprocessor coupled directly to said high speed data bus;
a numeric co-processor coupled directly to sad high speed data bus;
volatile memory coupled directly to sad high speed data bus for volatile storage of data;
a storage memory device for nonvolatile storage of data;
a storage controller coupled directly to sad high speed data bus and to said storage memory device for regulating communications with said storage memory device;
an input/output data bus;
an input/output controller coupled directly to sad input/output data bus;

a digital signal processor coupled directly to said input/output data bus;

a video signal processor coupled directly to input/output data bus; and a bus interface controller coupled to sad high speed data bus and to said input/output data bus for providing communications between said high speed data bus and sad input/output data bus, said bus interface controller providing for (a) arbitration among said microprocessor and said storage controller coupled directly to said high speed data bus for access to said high speed data bus, and (b) arbitration among said high speed data bus and said input/output controller and said digital signal processor and said video signal processor coupled directly to said input/output data bus for access to said input/output data bus, said bus interface controller being coupled to said volatile memory for supplying row address select signals to sad volatile memory and thereby selecting data storage areas to be accessed, and said bus interface controller responding to a change in grant of access to sad high speed data bus to one of sad microprocessor and said storage controller by providing an anticipatory precharge of memory addresses and changing the row address select signal supplied to said volatile memory in preparation for access to potentially different data storage areas of said volatile memory more likely to be used by the one of said microprocessor and said storage controller which has won an arbitration for grant of access to said high speed data bus and thus minimizing wait states during changes in memory access as arbitration occurs.

12. A personal computer according to claim 11 wherein said bus interface controller defines (1) a local bus arbitration control point through which said storage controller arbitrates for access to said high speed data bus and (2) a central arbitration control point through which said input/output controller and said digital signal processor and said video signal processor arbitrate for access to said input/output data bus, said storage controller signals to said bus interface controller a request for control of said high speed data bus, and said bus interface controller signals to each of said microprocessor and said storage controller any grant of control of said high speed data bus.

13. A personal computer according to claim 12 wherein said bus interface controller ranks said microprocessor and said storage controller in priority order for signalling a grant of control.

14. A personal computer according to claim 13 wherein said bus interface controller rotates priority among said storage controller and any other two master devices coupled directly to said local processor bus and assigns lowest priority among any two such devices and said storage controller each signalling a request for bus access to that one which has most recently obtained control of the local processor bus.

15. A personal computer according to claim 11 wherein said bus interface controller defines (1) a local bus arbitration control point through which said storage controller arbitrates for access to said high speed data bus and (2) a central arbitration control point through which said input/output controller and said digital signal processor and said video signal processor arbitrate for access to said input/output data bus, said microprocessor is a default master normally controlling said high speed data bus, both of said control points exchange with said input/output bus signals indicative of input/output bus arbitration, preemption and burst data transfer, said control points exchange with one another signals indicative of a hold on arbitration by said central arbitration control point and of acknowledgement of such a hold, and said local bus arbitration control point exchanges with said microprocessor signals indicative of a hold on access by said microprocessor and of acknowledgement of such a hold.

* * * * *